US008813071B2

(12) United States Patent
Tatavarty

(10) Patent No.: US 8,813,071 B2
(45) Date of Patent: Aug. 19, 2014

(54) STORAGE RECLAMATION SYSTEMS AND METHODS

(75) Inventor: Venkata Ratnam Tatavarty, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 345 days.

(21) Appl. No.: 13/018,256

(22) Filed: Jan. 31, 2011

(65) Prior Publication Data

US 2012/0198443 A1    Aug. 2, 2012

(51) Int. Cl.
G06F 9/455    (2006.01)
G06F 21/00    (2013.01)

(52) U.S. Cl.
USPC .................................................. 718/1; 711/6

(58) Field of Classification Search
CPC ................................................. G06F 9/45533
USPC ............................................................. 718/1
See application file for complete search history.

(56) References Cited

U.S. PATENT DOCUMENTS

| | | | |
|---|---|---|---|
| 6,128,715 A | 10/2000 | Wang et al. | |
| 6,314,501 B1 | 11/2001 | Gulick et al. | |
| 7,353,350 B2 | 4/2008 | Klassen et al. | |
| 7,603,532 B2 | 10/2009 | Rajan et al. | |
| 7,631,155 B1 | 12/2009 | Bono et al. | |
| 7,653,832 B2 | 1/2010 | Faibish et al. | |
| 7,676,704 B2 | 3/2010 | Hong et al. | |
| 7,694,082 B2 | 4/2010 | Golding et al. | |
| 7,822,939 B1 | 10/2010 | Veprinsky et al. | |
| 7,941,709 B1 | 5/2011 | Hong et al. | |
| 8,429,276 B1* | 4/2013 | Kumar et al. | 709/226 |
| 8,438,362 B2 | 5/2013 | Mukherjee et al. | |
| 2005/0005018 A1* | 1/2005 | Datta | 709/229 |
| 2007/0016904 A1* | 1/2007 | Adlung et al. | 718/1 |
| 2008/0189498 A1 | 8/2008 | Brown | |
| 2009/0049453 A1* | 2/2009 | Baran et al. | 719/313 |
| 2009/0204723 A1* | 8/2009 | Tonsing et al. | 709/238 |
| 2010/0049735 A1 | 2/2010 | Hsu | |
| 2010/0191908 A1 | 7/2010 | Yamakawa | |
| 2010/0241785 A1* | 9/2010 | Chen et al. | 711/6 |
| 2011/0010495 A1 | 1/2011 | Haustein et al. | |
| 2011/0131443 A1* | 6/2011 | Laor et al. | 714/5.11 |
| 2012/0054746 A1 | 3/2012 | Vaghani et al. | |
| 2012/0260050 A1 | 10/2012 | Kaliannan | |
| 2012/0271870 A1 | 10/2012 | Patwardhan et al. | |
| 2012/0278580 A1 | 11/2012 | Malige et al. | |
| 2012/0311291 A1 | 12/2012 | Fiske et al. | |
| 2013/0073914 A1 | 3/2013 | Kaul et al. | |

OTHER PUBLICATIONS

Schreuder, Willem A. "Accessing Files on Unmounted File Systems." Proceedings of the LISA 2001 15th Systems Administration Conference. Dec. 2-7, 2001, San Diego California. 7 pages.

* cited by examiner

*Primary Examiner* — Emerson Puente
*Assistant Examiner* — Charlie Sun
(74) *Attorney, Agent, or Firm* — Wilmer Cutler Pickering Hale and Dorr LLP

(57) ABSTRACT

Efficient and effective storage reclamation systems and methods are presented. In one embodiment, a storage reclamation method comprises: receiving an indication from a virtual machine that a reclamation opportunity for reclamation of a physical storage resource is available; and performing a reclamation process of the physical storage resource in accordance with the indication from the virtual machine that the reclamation opportunity is available, wherein the reclamation process is performed while the virtual machine is running. The indication can be received from a virtual communication protocol (e.g., can include an in-band communication protocol, out-of band communication protocol, a socket based communication protocol or a serial character device communication protocol).

20 Claims, 12 Drawing Sheets

100

110
Establishing a virtual machine environment including virtual machines running on a physical host.

120
Executing virtual machine operations in the virtual machine environment, including operations that offer opportunity for freeing up a virtual storage.

130
Reforming a reclamation process including reclamation of a physical storage resource while the virtual machine is running.

310
Receiving an indication from a virtual machine that a reclamation opportunity for reclamation of a physical storage resource is available.

320
Performing a reclamation process of the physical storage resource in accordance with said indication from said virtual machine that said reclamation opportunity is available, wherein said reclamation process is performed while said virtual machine is running.

410
Parsing an indication of the virtual storage location that is associated with opportunity for reclamation.

420
Translating the indication of the virtual storage location into an indication of a corresponding physical storage resource location.

430
Performing actual reclamation of the corresponding physical storage resource location.

510
A virtual machine initiates a virtual storage reclamation.

---

520
A reclamation indication is communicated in accordance with a reclamation communication protocol.

FIG 5

900
Storage reclamation module

910
Virtual machine communication module.

920
Physical reclamation module.

921
Parsing module.

922
Translation module.

923
Reclamation module.

FIG 9

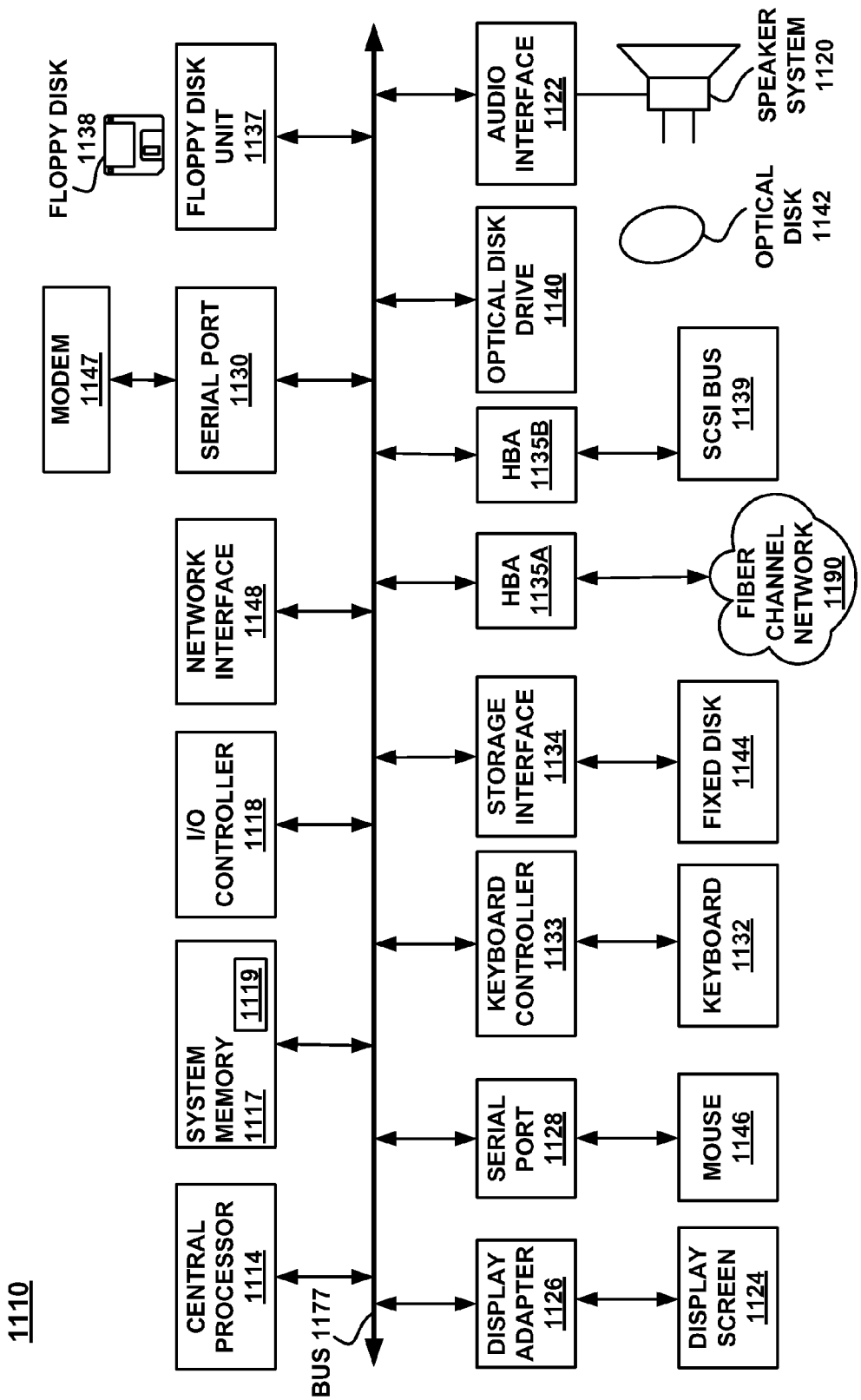

STORAGE RECLAMATION SYSTEMS AND METHODS

FIELD OF THE INVENTION

The present embodiments relate to the field of storage reclamation systems and methods.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Coordinating utilization of the vast amounts of storage can be complex and complicated.

Virtual environments typically include virtualized computers and/or operating systems known as virtual machines or guests which access host hardware or physical resources through emulated devices presented by a hypervisor. Accesses for virtual storage writes often involve the consumption of host hardware or physical storage resources. Conventional storage utilization and management often involve attempts at storage reclamation. While traditional attempts may allow for physical storage recovery and reclamation in some situations, attempted physical reclamation corresponding to virtual reclamation is usually very difficult. Storage used for the purpose of storing virtual machine images and application data deleted inside a virtual machine does not typically result in storage reclamation on the actual physical storage. Traditional approaches to storage reclamation in virtual environments typically require the virtual machine to be "shut down" and the entire virtual machine image to be deleted.

Repeatedly shutting down a virtual machine to reclaim physical memory can adversely impact realization of performance results and the ability of the virtual machine in achieving the results. While conventional approaches of leaving the virtual machine running for extended periods of time to enable realization of results usually creates consumption of significant amounts of resources including portions that can not be readily reclaimed. Providing the level of storage resources to accommodate the traditional approaches to prolonged running of virtual machines can be inconvenient and inefficient.

SUMMARY

Efficient and effective storage reclamation systems and methods are presented. In one embodiment, a storage reclamation method comprises: receiving an indication from a virtual machine that a reclamation opportunity for reclamation of a physical storage resource is available; and performing a reclamation process of the physical storage resource in accordance with the indication from the virtual machine that the reclamation opportunity is available, wherein the reclamation process is performed while the virtual machine is running. In one embodiment, the opportunity for reclamation of a physical storage resource corresponds to a variety of operations of the virtual machine and the indication is included in a reclamation communication protocol. The reclamation communication protocol can include an in-band communication protocol. The reclamation communication protocol can include an out-of-band communication protocol. The reclamation communication protocol can include a socket based communication protocol. The reclamation communication protocol can include a serial character device communication protocol. The indication of a reclamation opportunity can correspond to a virtual storage reclamation indication by the virtual machine. In one embodiment, a reclamation process can include: receiving an indication of the virtual storage location that is associated with an opportunity for reclamation; translating the indication of the virtual storage location into an indication of a corresponding physical storage resource location; and performing actual reclamation of the corresponding physical storage resource location.

In one embodiment a computer readable storage medium having stored thereon, computer executable instructions that, when executed by a computer system cause the computer system to perform a method comprising: receiving an indication from a virtual machine that a reclamation opportunity for reclamation of a physical storage resource is available; and performing a reclamation process of the physical storage resource in accordance with the indication from the virtual machine that the reclamation opportunity is available, wherein the reclamation process is performed while the virtual machine is running. In one embodiment, the opportunity for reclamation of a physical storage resource corresponds to a variety of operations of the virtual machine and the indication is included in a reclamation communication protocol. The reclamation communication protocol can include an in-band communication protocol. The reclamation communication protocol can include an out-of band communication protocol. The reclamation communication protocol can include a socket based communication protocol. The reclamation communication protocol can include a serial character device communication protocol. The indication of a reclamation opportunity can correspond to a virtual storage reclamation indication by the virtual machine. In one embodiment, a reclamation process can include: receiving an indication of the virtual storage location that is associated with an opportunity for reclamation; translating the indication of the virtual storage location into an indication of a corresponding physical storage resource location; and performing actual reclamation of the corresponding physical storage resource location.

In one embodiment a computer system, comprises a computer system having a processor coupled to a computer readable storage media and executing computer readable code which causes the computer system to perform operations including: receiving an indication from a virtual machine that a reclamation opportunity for reclamation of a physical storage resource is available; and performing a reclamation process of the physical storage resource in accordance with the indication from the virtual machine that the reclamation opportunity is available, wherein the reclamation process is performed while the virtual machine is running. In one embodiment, the opportunity for reclamation of a physical storage resource corresponds to a variety of operations of the virtual machine and the indication is included in a reclamation communication protocol. The reclamation communication protocol can include an in-band communication protocol. The reclamation communication protocol can include out-of-band communication protocol. The reclamation communication protocol can include a socket based communication protocol. The reclamation communication protocol can include a serial character device communication protocol. The indication of a reclamation opportunity can correspond to a virtual storage reclamation indication by the virtual machine. In one embodiment, a reclamation process can include: receiving an indication of the virtual storage location that is associated with an opportunity for reclamation; translating the indication of the virtual storage location into an indication of a corresponding physical storage resource location; and performing actual reclamation of the corresponding physical storage resource location.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a block diagram of an exemplary virtual environment method in accordance with one embodiment of the present invention.

FIG. 3 is a block diagram of an exemplary storage reclamation method in accordance with one embodiment of the present invention.

FIG. 4 is a block diagram of an exemplary reclamation process in accordance with one embodiment of the present invention.

FIG. 5 is a block diagram of a reclamation communication process in accordance with one embodiment of the present invention.

FIG. 9 is a block diagram of an exemplary storage reclamation module in accordance with one embodiment of the present invention.

FIG. 11 depicts a block diagram of an exemplary computer system suitable for implementing the present methods in accordance with one embodiment of the present invention.

DETAILED DESCRIPTION

Figure 2:
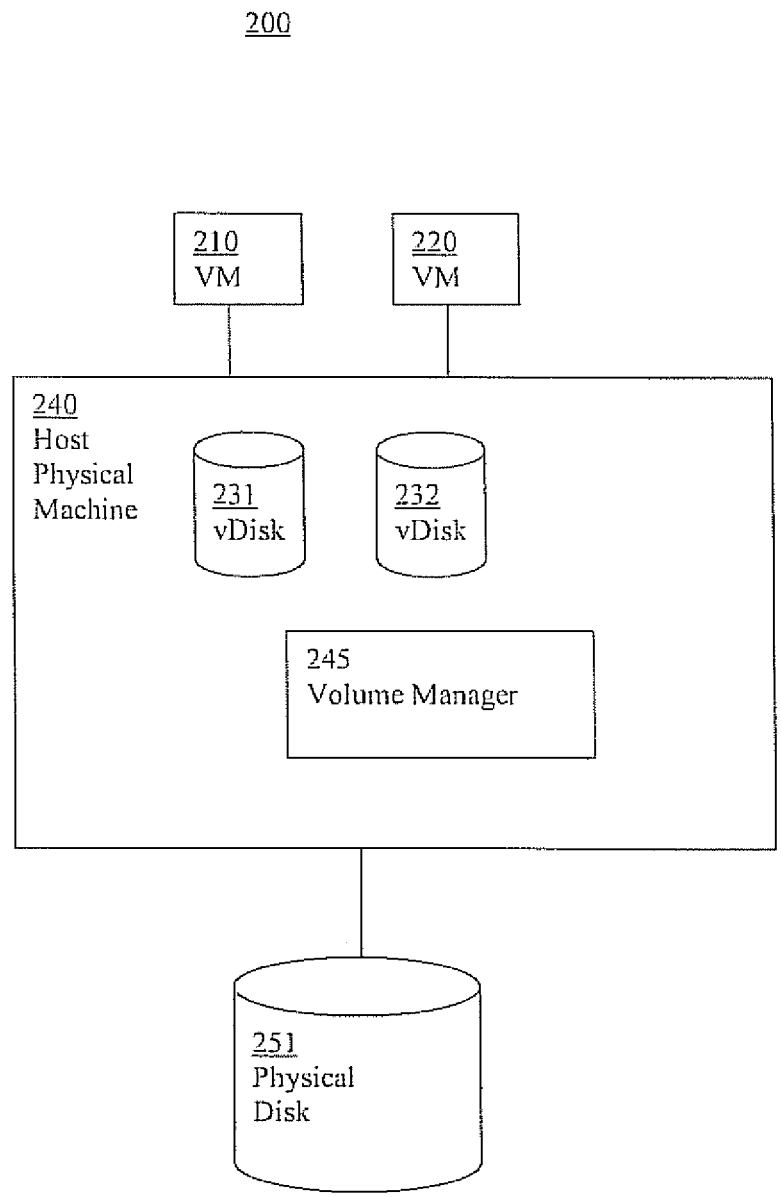
FIG. 2 is a block diagram of an exemplary virtual machine environment in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods that facilitate efficient and effective resource reclamation on a host system are presented. The systems and methods can be utilized in a variety of different architectures and environments. In one embodiment, reclamation of physical storage resources corresponding to reclamation or deletion of virtual storage is performed while an associated virtual machine is running. Performing physical storage reclamation while the associated virtual machine is running facilitates rapid and convenient reclamation of the physical storage reducing the rate of storage consumption. Physical storage can be freed up for use reallocation with little or no overhead impact on the virtual machine operations. The physical reclamation can be a multiple or the data deleted inside the VM depending on the count of mirroring used.

In one embodiment, a virtual machine utilizes a reclamation communication protocol to communicate to a host that host storage resources are no longer required. In one exemplary implementation, the reclamation communication protocol facilitates platform independent agnostic execution of the physical storage resource reclamation.

FIG. 1 is a block diagram of a virtual environment method 100 in accordance with one embodiment of the present invention. In one embodiment, the actual physical storage availability on physical resources that are at various points associated with virtual environment 100 can efficiently improve. In one exemplary implementation, physical storage resources that are at some point "consumed" by activities or operations associated with virtual environment 100 are "freed up" or reclaimed for utilization by other activities or operations (that may or may not be associated with virtual environment 100).

In block 110 a virtual machine environment is established. In one embodiment, a virtual machine environment includes a virtual machine running on a physical host. Some of the operations can result in the consumption of host resources. In one embodiment, the virtual machine process involves "booting up" a virtual machine, etc. In one exemplary implementation, the "booting up" can include creating a virtual machine image on resources of a physical host. In one embodiment a host/hypervisor provisions storage for a virtual machine from various storage entities (e.g., native LUN (physical) entities, volumes of a volume manager (abstract) entities, etc.). The virtual machines consume the storage entities as their boot/data disks with standalone file systems inside.

In block 120, virtual machine operations are executed in the virtual machine environment. It is appreciated that a virtual machine process can include a variety of operations. The virtual machine operations can include operations that offer opportunity for freeing up virtual storage (e.g., virtual disk space, etc.). In one embodiment, some of the virtual machine operations can result in no longer needing host resources. For example, a virtual machine may perform a virtual data deletion, virtual defragmentation, virtual resize operations or other virtual operations resulting in no longer needing host resources, resulting in a chance or opportunity to reclaim physical storage resources associated with the host.

In block 130, a storage reclamation process is performed including reclamation of physical storage resources while the virtual machine is running. The storage reclamation process can be performed in accordance with the virtual machine operations that offer opportunity for freeing up virtual storage. In one embodiment, an indication of freed up or unneeded virtual storage (e.g., virtual disk space, etc.) is forwarded to a volume manager via a reclamation communication protocol.

It is appreciated that the reclaimed physical resources can be utilized for a variety of activities and operations. The reclaimed physical resources can be made available for other activities and operations associated with virtual environment 100. The reclaimed physical resources can be made available for other activities and operations (e.g., activities and operations associated with a different virtual machine, activities and operations not associated with virtual environment 100, etc.).

FIG. 2 is a block diagram of virtual machine environment 200 in accordance with one embodiment of the present invention. Virtual machine environment 200 includes virtual machine (VM) 210, virtual machine (VM) 220, virtual disk 231, virtual disk 232, host 240 and physical disk 251. The components of virtual machine environment 200 cooperatively operate to perform various operations, including reclamation of physical storage resources within physical disk 251.

In one embodiment, virtual machine (VM) 210, virtual machine (VM) 220 are programmable machine abstractions implemented in software running on and utilizing various physical resources associated with host physical machine 240. Virtual disk 23 and virtual disk 232 are virtual abstractions of storage resource locations or addresses configured and maintained by volume manager 245. Host 240 is a physical machine resource. It is appreciated that host 240 can have a variety of configurations including being one or more physical machines or components. In one embodiment, host 240 performs the actual operations associated with the virtual machine operations and the volume manager operations. Host 240 utilizes physical storage resources of physical disk 251 to implement virtual disk 231 and virtual disk 232 and actually store information associated with virtual machine (VM) 210 and virtual machine (VM) 220. It is appreciated that physical disk 251 can have a variety of configurations including being one or more physical disks or components.

In one embodiment, a hypervisor (not shown) running on host physical machine 240. The hypervisor interfaces with various hardware components of the host physical machine provides physical host and physical storage resources and services to virtual machines 210 and 220. In one exemplary implementation, the hypervisor also interfaces with a volume manager that includes tools used to manage storage coming from physical hardware storage resources. In one embodiment, indexes or addresses of indicating virtual storage locations with respect to virtual disk 231 and virtual disk 231 are translated by a volume manager to indexes or addresses to indicate physical storage locations with respect to physical storage disk 250.

In one embodiment, physical storage resources of physical disk 251 are reclaimed in virtual machine environment 200 while a corresponding virtual machines continues to run (e.g., virtual machine (VM) 210, virtual machine (VM) 220, etc.). In one exemplary implementation, the physical storage resources of physical disk 251 that are reclaimed correspond to an indication of a virtual machine reclamation of virtual storage in a virtual storage disk (e.g., virtual disk 231, virtual disk 231, etc.). A virtual machine (e.g., virtual machine (VM) 210, virtual machine (VM) 220, etc.) communicates an indication of a virtual reclamation operation to the volume manager 245. The indication of the virtual reclamation operation can include an address or multiple addresses within a virtual disk to be reclaimed (e.g., virtual disk 231, virtual disk 231, etc.). It is appreciated that the multiple addresses can be indicated by a range of addresses. The virtual address indication is translated by volume manager 245 to a corresponding physical address within physical storage resource 251.

In one embodiment, a physical storage resource associated with a virtual reclaimed storage location is also reclaimed. The virtual and physical storage resources are reclaimed while the virtual machine (e.g., virtual machine (VM) 210, virtual machine (VM) 220, etc.) continues to run. In one embodiment, the volume manager directs reclamation of the corresponding physical address within storage resource 251. The indication of the virtual reclaimed address is communicated to the volume host by a reclamation communication protocol (e.g., an out of band independent platform agnostic communication protocol, an in band communication protocol, etc.). Additional information on various communication protocols is described in following sections.

FIG. 3 is a block diagram of exemplary storage reclamation method 300 in accordance with one embodiment of the present invention.

In block 310, an indication is received from a virtual machine that a reclamation opportunity is available. The indication of a reclamation opportunity can correspond to a variety of operations within a virtual machine. In one embodiment, the indication can be an indication of virtual storage reclamation. In one embodiment, the indication is received as part of a reclamation communication process. In one exemplary implementation, wherein the indication of a reclamation opportunity corresponds to an operation that is associated with freeing up virtual storage space (e.g., deletion, reformatting, etc.) that can be translated into reclamation of physical storage resources.

In block 320, a reclamation process is performed on the physical storage while the virtual machine is still running. In one embodiment, the reclamation process includes reclaiming physical storage resources associated with reclaimed or deleted virtual storage space.

FIG. 4 is a block diagram of an exemplary reclamation process 400 in accordance with one embodiment of the present invention. In one embodiment, exemplary reclamation process 400 is similar to an exemplary reclamation process utilized in block 320.

In block 410, an indication that a reclamation opportunity is available is parsed to determine a virtual storage location that is associated with the opportunity for reclamation. In one embodiment, an indication received in block 310 is parsed to determine a virtual storage address or indication of a virtual storage location that a virtual machine has virtually reclaimed of has indicated is no longer needed. In one exemplary implementation, the virtual storage address can be associated with a virtual machine performance of a virtual data deletion, virtual defragmentation, virtual resize operations or other virtual operations resulting in no longer needing host resources.

In block 420, the indication of the virtual storage location is translated into an indication of a corresponding physical storage resource location. Additional information on exemplary virtual storage location translation into an indication of a corresponding physical storage resource location is described in following sections.

In block 430, actual reclamation of the corresponding physical storage resource location is performed. In one embodiment, the reclamation of a physical storage resource location includes converting used or allocated storage space to unused or allocated storage space. Un-allocating the storage space makes the storage space available for other activities and operations.

In one embodiment, the actual reclamation of the corresponding physical storage resource location can be performed in response to a trigger. For example, the trigger may be the indication of the virtual storage reclamation itself and the physical storage reclamation occurs rapidly or the trigger may be something associated with an event occurring at a later time (e.g., during scheduled maintenance, periodic time intervals, etc.). In one exemplary implementation, the trigger event is an amount of virtual storage reclamation. For example, the trigger event may be a 1 GB amount of virtual storage reclamation and if a single virtual storage reclamation includes reclamation of 1 GB or more of memory the physical storage reclamation is performed rapidly whereas if there are multiple 1 MB operations the physical storage reclamation is not performed until the tenth 1 MB virtual reclamation trigger is indicated. In one embodiment, a daemon is utilized to direct timing of the communication of the virtual reclamation of deletion operation events to the hypervisor and volume manager.

It is appreciated the physical reclamation can be a multiple or the data virtually reclaimed (e.g., in virtual storage) depending on the count of mirroring used. In one embodiment, a virtual storage location is mirrored on multiple physical storage locations and when a virtual machine indicates virtual reclamation of the virtual storage location, the multiple physical storage locations can be reclaimed also. In one exemplary implementation, a virtual storage location indication being reclaimed is translated into multiple corresponding physical storage location indications.

FIG. 5 is a block diagram of a reclamation communication process 500 in accordance with one embodiment of the present invention. In one embodiment, information communicated in reclamation communication process 500 is communicated as part of a reclamation communication protocol. Additional information on reclamation communication protocols is described in following sections.

In block 510 a virtual machine initiates a virtual storage reclamation. In one exemplary implementation, the initiated virtual storage reclamation can be associated with a virtual machine performance of a virtual data deletion, virtual defragmentation, virtual resize operations or other virtual operations resulting in no longer needing host resources.

In block 520, the reclamation indication is communicated in accordance with a reclamation communication protocol. It is appreciated the reclamation communication protocol can include a variety of configurations. In one embodiment, the virtual storage reclamation indication is communicated to a host (e.g., to a hypervisor residing on a host, to a volume manager residing on a host, etc.). In one embodiment, the reclamation communication protocol can include a dedicated control channel. In one exemplary implementation, a reclamation protocol can be an in-band communication protocol or an out of band communication protocol.

In one embodiment, an in-band communication channel of a guest virtual machine to host hypervisor is used to communicate block regions of the volume by the filesystem undergoing deletion so that the host routines issue a related request on the translated offsets. In one embodiment, an in-band communication protocol includes (e.g., as part of the virtual operation notification to the volume manager, etc.) an indication (e.g., tag, field, etc.) that the operation involves an opportunity for physical storage resource reclamation. In one exemplary implementation, a tag is included as part of a virtual data deletion operation itself and the virtual data deletion operation is uploaded with the tag so that when it reaches the volume manager, the volume manager recognizes the virtual data deletion operation to be an operation providing an opportunity for physical storage resource reclamation.

In one embodiment, an out-of band communication channel can include a serial/stream interface protocol or serial character device communication protocol (e.g., between a virtual machine and a hypervisor). In one embodiment of a serial character device communication protocol there is a serial character device inside each VM and a corresponding character device node on the hypervisor so that a normal IO can be piped between the two. In one embodiment of a serial character device communication protocol there is a serial character device inside each VM and a corresponding operating system hook (e.g., IOCTL, etc.) on the hypervisor invoking the hypervisor via a dedicated channel. In one exemplary implementation, a socket interface protocol can be utilized to send the indication of an opportunity for physical storage reclamation through a dedicated control channel (e.g., on a network, as part of a TCP communication, as part of a LLT communication, etc.). In one embodiment a virtual input/output interface of a hypervisor is utilized. In one embodiment, a, there is a separate port (e.g., hypervisor API, etc.) associated with the VM/guest installation to communicate hypervisor/guest specific reclamation information with the hypervisor. In one exemplary implementation, the serial interfaces facilitates independence from network components and as a result, the VMs and hypervisor can talk at any stage of bootup or in case VM networking is disabled.

Figure 6:
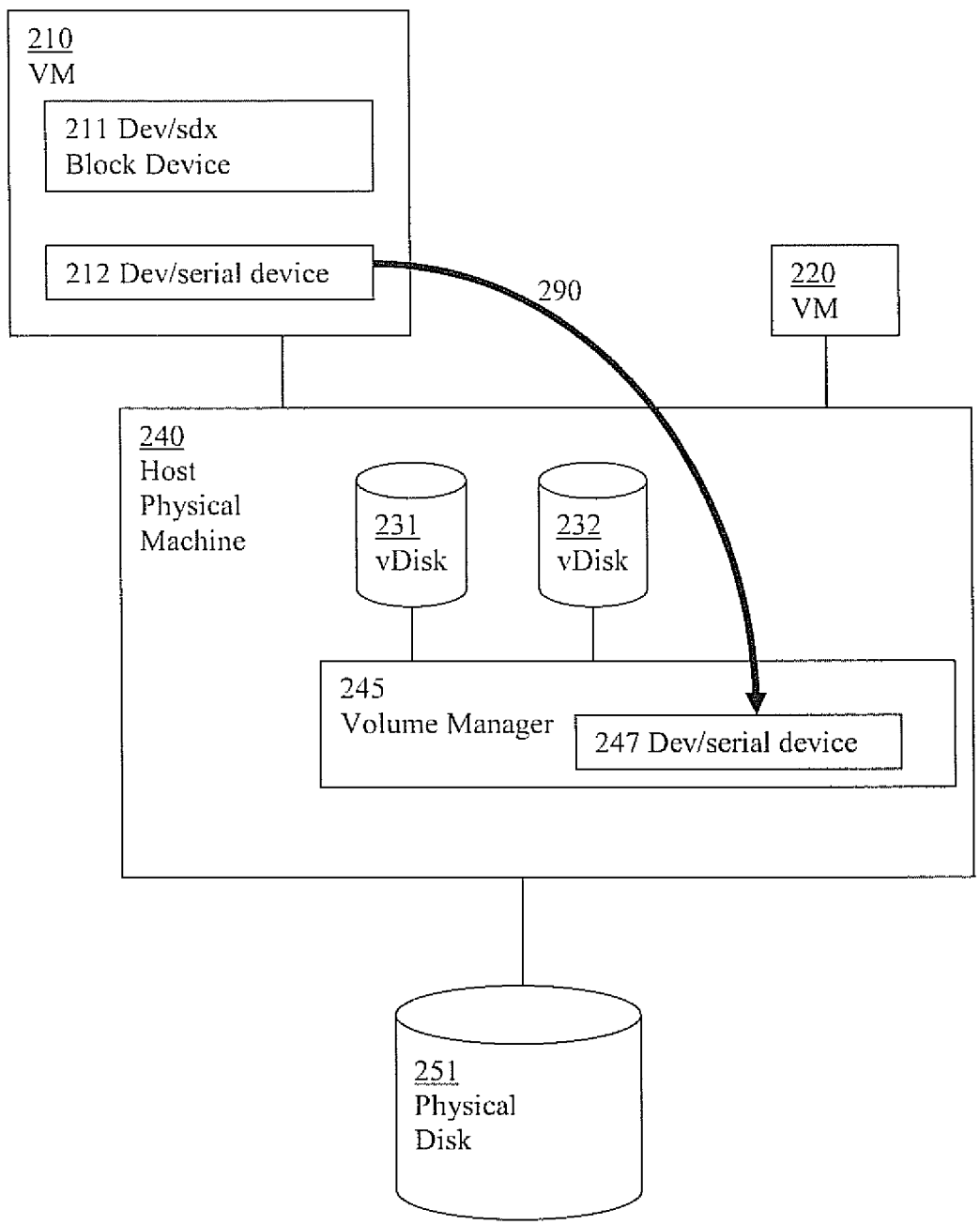
FIG. 6 is a block diagram of an exemplary virtual machine environment with an exemplary serial protocol communication channel in accordance with one embodiment of the present invention.

FIG. 6 is a block diagram of virtual machine environment 200 with a serial protocol communication channel 290 in accordance with one embodiment of the present invention. In one embodiment, virtual machine 210 includes a block device dev/sdx 211 and a serial character device 212 while volume manager 245 includes a serial character device 247.

Figure 7A:
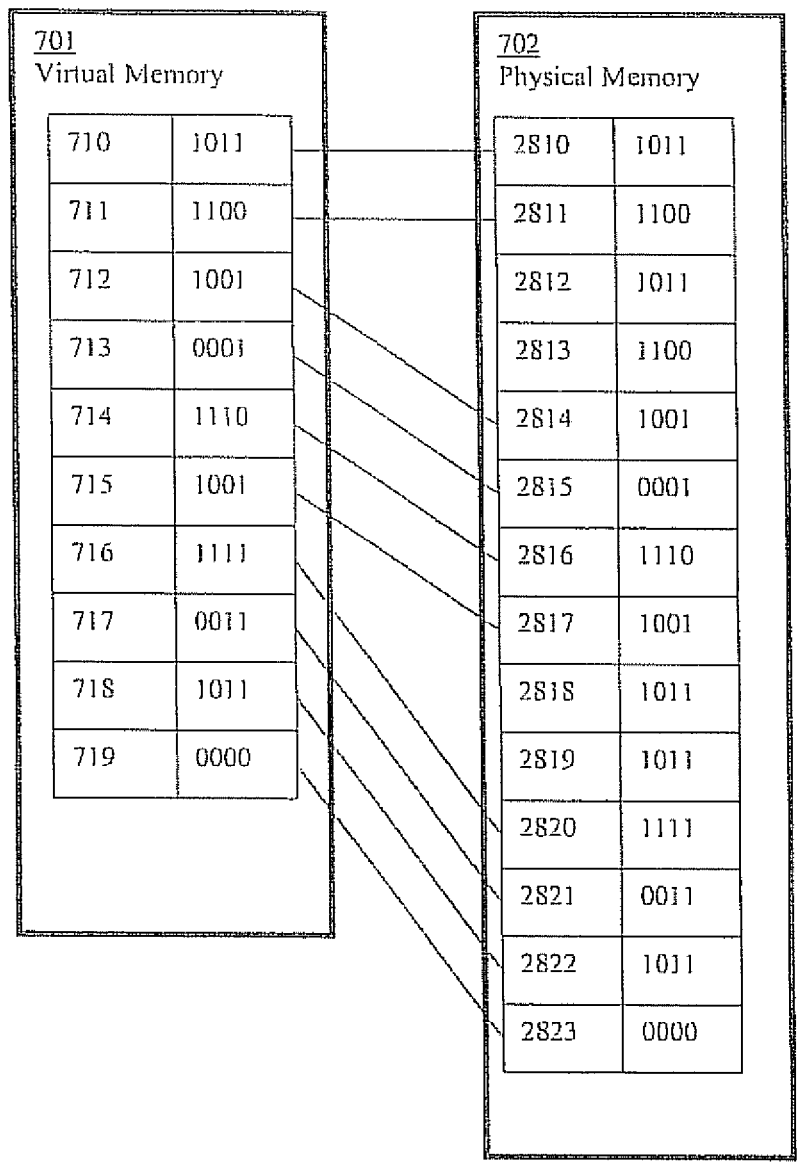
FIG. 7A is a block diagram of an exemplary virtual storage and physical storage resource configuration after several application operations in a virtual machine in accordance with one embodiment of the present invention.

FIG. 7A is a block diagram of exemplary virtual storage and physical storage resource configuration after several application operations in a virtual machine.

Figure 7B:
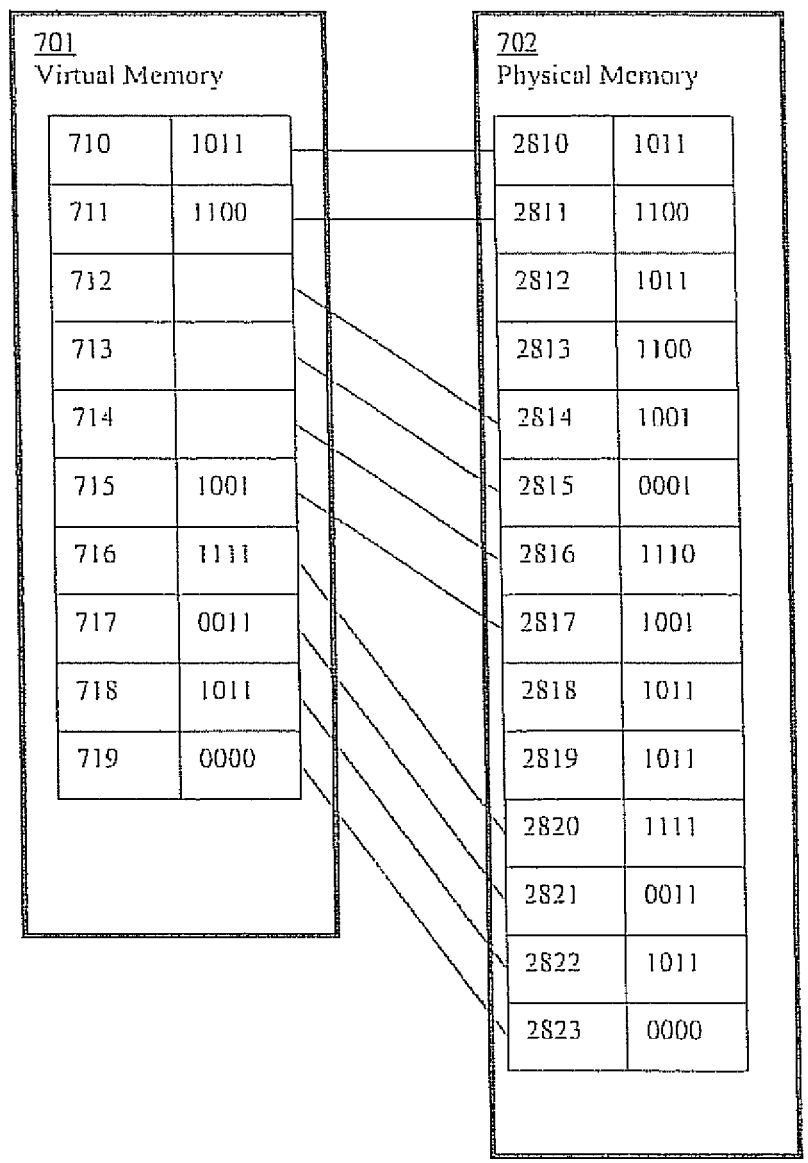
FIG. 7B is a block diagram of an exemplary virtual storage and physical storage resource configuration after virtual storage reclamation in accordance with one embodiment of the present invention.

FIG. 7B is a block diagram of exemplary virtual storage and physical storage resource configuration after virtual storage reclamation. In one embodiment, virtual storage at virtual addresses or locations 712, 713 and 714 have been virtually reclaimed. In one embodiment, physical storage locations 2814, 2815 and 2816 have not undergone reclamation yet. It is appreciated that in one embodiment, virtual storage at locations 712, 713 and 714 are shown as "blank" so as to conveniently indicate the virtual storage locations are reclaimed.

Figure 8:
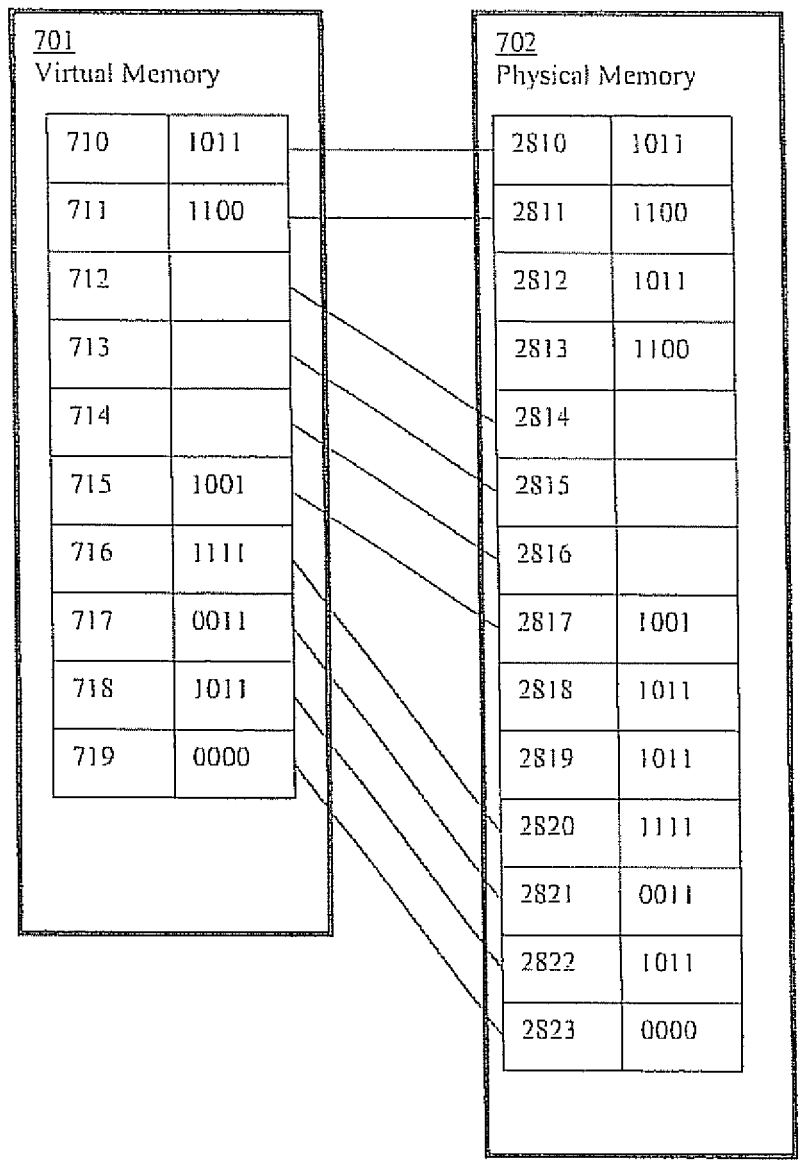
FIG. 8 is a block diagram of an exemplary virtual storage and physical storage resource configuration after physical storage resource reclamation in accordance with one embodiment of the present invention

FIG. 8 is a block diagram of exemplary virtual storage and physical storage resource configuration after physical storage resource reclamation. In one embodiment, a present address or location translation is performed and corresponding physical storage resources at physical addresses or locations 2814, 2815 and 2816 have been reclaimed. In one embodiment, physical storage resources at locations 2814, 2815 and 2816 are shown as "blank" so as to conveniently indicate the virtual storage are reclaimed. It is appreciated the physical storage resources at locations 2814, 2815 and 2816 may actually include logical values (e.g., 1, 0, etc.) and a flag or other indicator is set to indicate the physical storage resources at locations 2814, 2815 and 2816 are reclaimed and available or not being used by an entity (e.g., virtual machine, program, application, etc.).

FIG. 9 is a block diagram of exemplary storage reclamation module 900 which includes instructions for directing a processor in the performance of an exemplary storage reclamation method (e.g., exemplary storage reclamation method 300, etc.) in accordance with one embodiment of the present invention. Exemplary storage reclamation module 900 includes virtual machine reclamation communication module 910 and physical reclamation module 920. Virtual machine reclamation communication module 910 includes instructions for communicating an indication of a virtual storage reclamation or deletion. In one embodiment, virtual machine reclamation communication module 910 includes instructions for sending an indication of a virtual storage reclamation or deletion. In one embodiment, virtual machine reclamation communication module 910 includes instructions for receiving an indication of a virtual storage reclamation or deletion. In one embodiment, virtual communication module 910 includes instructions for receiving an indication of a virtual storage reclamation or deletion as indicated in block 310. Physical reclamation module 920 includes instructions for executing the physical storage reclamation while a corresponding virtual machine is running. In one embodiment, physical reclamation module 920 includes instructions for executing the physical storage reclamation while a corresponding virtual machine is running as indicated in block 320. In one embodiment, physical reclamation module 920 includes parsing module 921, translation module 922 and reclamation module 923 include instructions for executing operations associated with blocks 510, 520 and 530 respectively.

Figure 10:
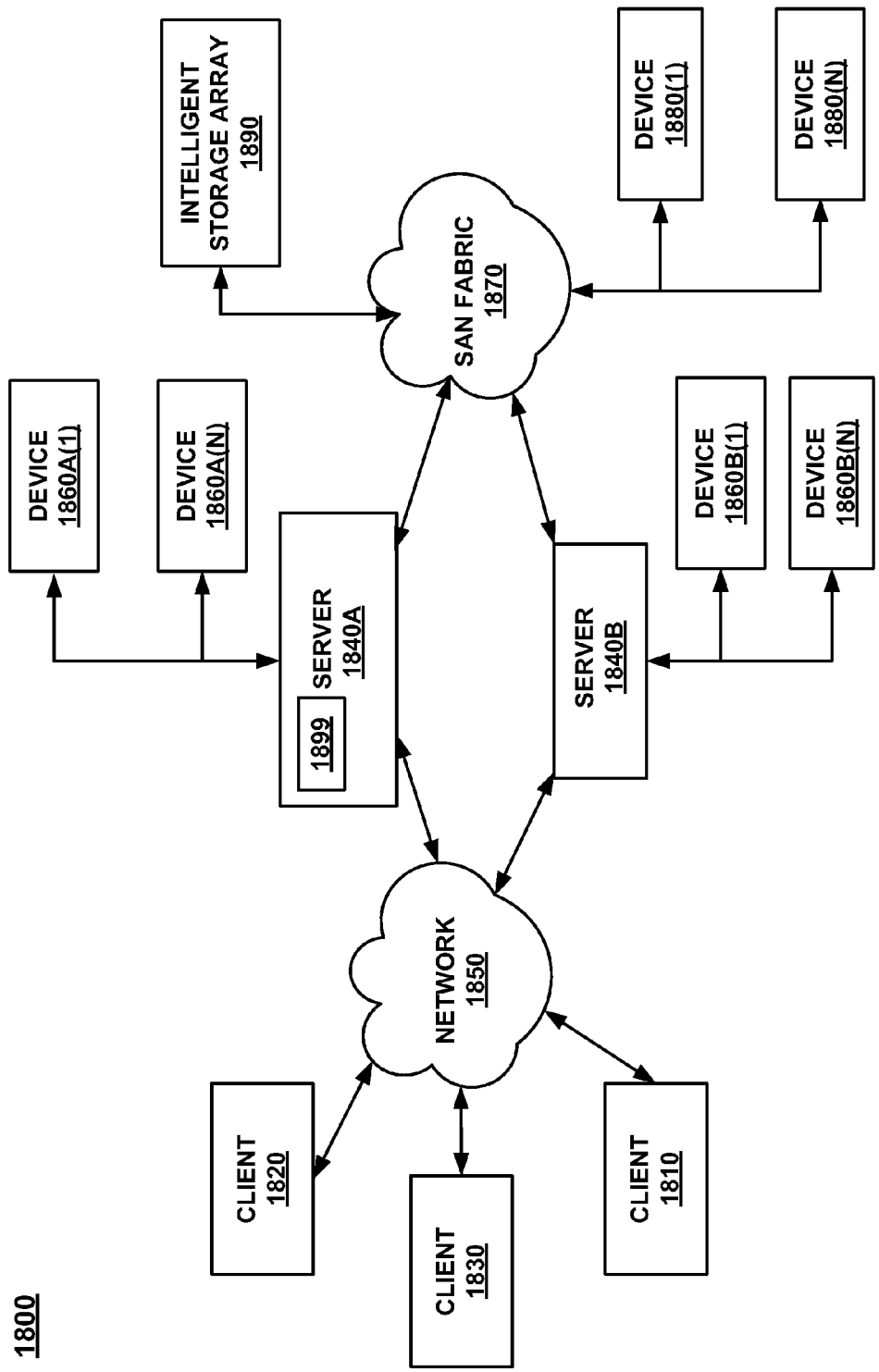
FIG. 10 is a block diagram depicting an exemplary network architecture in accordance with one embodiment of the present invention.

In one embodiment, a storage reclamation method (e.g., storage reclamation method 300, etc.) can be implemented on a network. FIG. 10 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes storage reclamation module 1899. In one embodiment, a storage reclamation 1899 is similar storage reclamation module 900. It is appreciated that present systems and methods are compatible with a variety of implementations. For example, portions of information and instructions associated with can be distributed in various resources.

FIG. 11 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a storage reclamation method (e.g., similar to storage reclamation method 300, etc.) are stored in one or more memories of computer system 1100 (e.g., in memory location 1119). The RAM is generally the main memory into which the operating system and application programs are loaded. In one embodiment, RAM 1117 includes a storage reclamation module (e.g., in memory location 1119). In one embodiment, a storage reclamation module stored in memory location 1119 is similar to storage reclamation module 900. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 11 depicts the use of a network such as the Internet for exchanging data, but the present disclosure is not limited to the Internet or any particular network-based environment.

Thus, the present systems and methods facilitate efficient and storage resource reclamation. The systems and methods can be utilized in a variety of different architectures and environments. The reclamation of physical storage resources corresponding to reclamation or deletion of virtual storage is performed while an associated virtual machine is running. Performing physical storage reclamation associated virtual machine is running facilitate rapid and convenient reclamation of the physical storage reducing the rate of storage consumption. Physical storage can be freed up for use reallocation with little or no overhead impact on the virtual machine operations. The physical reclamation can be a multiple or the data deleted inside the VM depending on the count of mirroring used. A virtual machine can utilize a dedicated communication channel to communicate to a host that host storage resources are no longer required. In one exemplary implementation, the dedicated communication channel facilitates platform independent agnostic execution of the physical storage resource reclamation.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:
1. A storage reclamation method comprising:
    receiving a first indication from a virtual machine that an opportunity for reclamation of a physical storage resource is available, wherein said reclamation opportunity corresponds to a variety of operations of said virtual machine and said first indication is included in a reclamation communication protocol; and performing a reclamation process of said physical storage resource in accordance with said first indication from said virtual machine that said reclamation opportunity is available, wherein said reclamation process of said physical storage resource is performed in response to a trigger, wherein said trigger comprises an event occurring after receiving said first indication, wherein said event is related to a plurality of successive virtual storage reclamation operations, and wherein said reclamation process is performed while said virtual machine is running.

2. The storage reclamation method of claim 1 wherein said reclamation communication protocol includes an in-band communication protocol.

3. The storage reclamation method of claim 1 wherein said reclamation communication protocol includes an out-of-band communication protocol.

4. The storage reclamation method of claim 1 wherein said reclamation communication protocol includes a socket based communication protocol.

5. The storage reclamation method of claim 1 wherein said reclamation communication protocol includes a serial character device communication protocol.

6. The storage reclamation method of claim 1 wherein the first indication of the reclamation opportunity corresponds to a virtual storage reclamation indication by said virtual machine.

7. The storage reclamation method of claim 1 wherein said reclamation process includes:
  receiving a second indication of a virtual storage location that is associated with an opportunity for reclamation;
  translating the second indication of the virtual storage location into a third indication of a corresponding physical storage resource location; and
  performing actual reclamation of the corresponding physical storage resource location.

8. A non-transitory computer readable storage medium having stored thereon computer executable instructions that, when executed by a computer system, cause the computer system to perform a method comprising:
  receiving a first indication from a virtual machine that an opportunity for reclamation of a physical storage resource is available, wherein said reclamation opportunity corresponds to a variety of operations of said virtual machine and said first indication is included in a reclamation communication protocol; and
  performing a reclamation process of said physical storage resource in accordance with said first indication from said virtual machine that said reclamation opportunity is available, wherein said reclamation process of said physical storage resource is performed in response to a trigger, wherein said trigger comprises an event occurring after receiving said first indication, wherein said event is related to a plurality of successive virtual storage reclamation operations, and wherein said reclamation process is performed while said virtual machine is running.

9. The non-transitory computer readable storage medium of claim 8 wherein said reclamation communication protocol includes an in-band communication protocol.

10. The non-transitory computer readable storage medium of claim 8 wherein said reclamation communication protocol includes an out-of-band communication protocol.

11. The non-transitory computer readable storage medium of claim 8 wherein said reclamation communication protocol includes a socket based communication protocol.

12. The non-transitory computer readable storage medium of claim 8 wherein said reclamation communication protocol includes a serial character device communication protocol.

13. The non-transitory computer readable storage medium of claim 8 wherein the first indication of a reclamation opportunity corresponds to a virtual storage reclamation indication by said virtual machine.

14. The non-transitory computer readable storage medium of claim 8, wherein the method further comprises:
  receiving a second indication of a virtual storage location that is associated with an opportunity for reclamation;
  translating the second indication of the virtual storage location into a third indication of a corresponding physical storage resource location; and
  performing actual reclamation of the corresponding physical storage resource location.

15. A computer system, comprising:
  a computer system having a processor coupled to a computer readable storage media and executing computer readable code which causes the computer system to perform operations including:
  receiving a first indication from a virtual machine that an opportunity for reclamation of a physical storage resource is available, wherein said reclamation opportunity corresponds to a variety of operations of said virtual machine and said first indication is included in a reclamation communication protocol; and
  performing a reclamation process of said physical storage resource in accordance with said first indication from said virtual machine that said reclamation opportunity is available, wherein said reclamation process of said physical storage resource is performed in response to a trigger, wherein said trigger comprises an event occurring after receiving said first indication, wherein said event is related to a plurality of successive virtual storage reclamation operations, and wherein said reclamation process is performed while said virtual machine is running.

16. The computer system of claim 15 wherein said reclamation communication protocol includes an in-band communication protocol.

17. The computer system of claim 15 wherein said reclamation communication protocol includes an out-of-band communication protocol.

18. The computer system of claim 15 wherein reclamation communication protocol includes a sockets based communication protocol.

19. The computer system of claim 15 wherein said reclamation communication protocol includes a serial character device communication protocol.

20. The computer system of claim 15, wherein the operations further include:
  receiving a second indication of a virtual storage location that is associated with an opportunity for reclamation;
  translating the second indication of the virtual storage location into a third indication of a corresponding physical storage resource location; and
  performing actual reclamation of the corresponding physical storage resource location.

* * * * *